Sept. 23, 1941.   S. FEINGOLD   2,256,802
INTERMITTENTLY OPERATING ELECTRICAL APPARATUS
Filed May 28, 1937
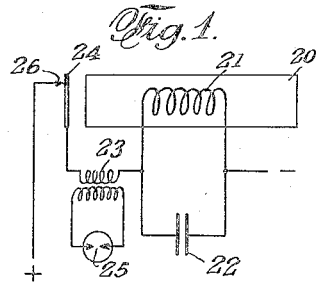
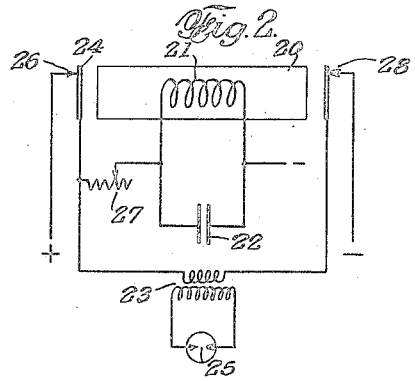
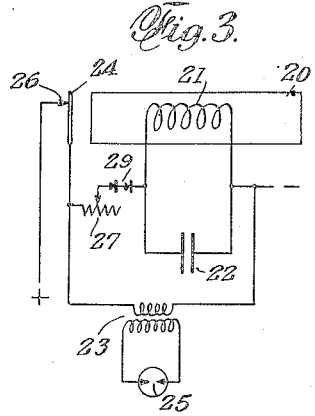
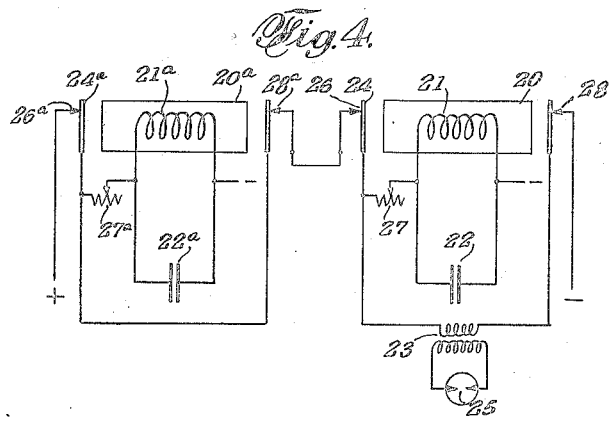
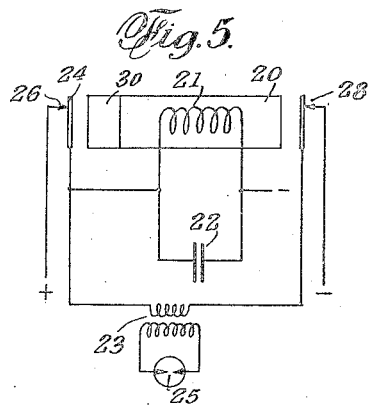
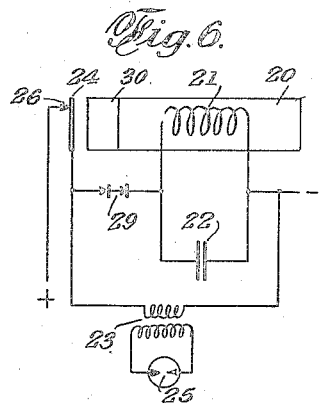
INVENTOR
SAMUEL FEINGOLD
BY
ATTORNEY Patented Sept. 23, 1941

2,256,802

UNITED STATES PATENT OFFICE 2,256,802

INTERMITTENTLY OPERATING ELECTRICAL APPARATUS

Samuel Feingold, New York, N. Y., assignor to Abraham Sprung, New York, N. Y.

Application May 28, 1937, Serial No. 145,286

5 Claims. (Cl. 175—373)

This invention relates to improvements in direct current intermittently operated electrical devices, and while more particularly pertaining to the operation of electrical devices requiring high voltages, broadly deals with devices of the character contemplated wherein only electrical means are provided for intermittently operating any desired electrical devices.

The invention is a continuation in part of my application bearing Serial No. 81,831, filed May 26, 1936, for "Apparatus for intermittently operating gaseous electric devices," abandoned and replaced by application Serial No. 279,113, filed June 14, 1939, and bearing the same title, this latter application becoming Patent No. 2,208,125 dated July 16, 1940.

In marking on roads the position of dangerous curves, cross-roads, and the like; or marking ship channels, and dangerous portions of waterways it is the practise to employ intermittently flashing lights, commonly called beacons. For this purpose, electrical discharge tubes filled with neon, argon or other such inert gases, have been found quite satisfactory. However, the use of such tubes require relatively high voltage, usually approximating 2500 volts; and since the above-mentioned beacons are frequently remotely located from power lines and other sources of electricity, it is necessary to operate the discharge tubes by means of intimately associated current supplying means such as storage or dry batteries. Heretofore, in the mentioned isolated installations, high voltage was obtained by mechanically breaking the circuit through a coil, but the operation of the mechanism placed a heavy load on the battery, and also, since there always was a delayed break of the circuit through the coil, rapid deterioration of the battery was caused. This necessitated frequent replacement of the battery with the attending possibility that sudden failure thereof, before replacement could be made, would result in the failure of operation of the beacon.

In this disclosure the term relay is intended to refer to any electro-magnetic device having a coil and one or more armatures adapted to be attracted when the coil is excited.

In accordance with the present invention, therefore, and seeking to obviate the above-mentioned faults, the break in the primary circuit of the transformer is caused by the excitation of a relay in parallel with a condenser or other means for charging and discharging electricity, the latter governing the time of operation of the relay. Hence, the employment of mechanical means for timing the circuit is obviated, and the battery is used only momentarily for each flash of the discharge tube.

The foregoing is intended to indicate one particular use of the invention which may also be employed to operate electrical devices requiring relatively low voltage. Thus it is apparent that other electrical load means may be substituted for the gas tubes.

The invention therefore, seeks to provide an apparatus for intermittently operating electrical devices wherein the current is derived from storage or dry batteries.

The invention further contemplates direct current operated electrical means in which delayed action is caused by charging and discharging means to cause intermittent operation of an electric device.

A further contemplated feature of the invention resides in the provision of an apparatus for intermittently operating electrical devices in which the interval between each operation may be controlled and determined by adjusting a non-inductive resistance or the capacity of the electric charge and discharge means.

Although the following specification indicates the electrical device to be operated, as a gas tube, it should be understood that any electrical load may be substituted for the transformer and gas tube load which is illustrated. As the description progresses, it will be seen that the invention may have many forms of embodiment and may be variably employed to provide intermittent operation of a load device, or intermittent operation of a control device. Also, these two may be combined to obtain variable timing of the operation of an electrical load device.

The foregoing and many other features of the invention are attained in the several embodiments of the invention as illustrated in the accompanying drawing which is described in the following specification.

In the drawing:

Fig. 1 is a wiring diagram of an apparatus embodying the invention as used for operating an electrical device requiring relatively high voltage.

Figs. 2 to 6 inclusive are wiring diagrams of alternate forms of the invention.

If a resistance in series with a condenser is connected across a source of D. C. potential, the condenser will charge up through the resistance. The phenomenon is not accomplished suddenly, rather, certain definite relations are established first. The instant potential is applied to a resistor and condenser in series combination, the charge on the condenser being zero, the counter electromotive force is also zero, and the full potential is therefore placed across the resistance resulting in the maximum current flowing into the condenser, governed only by the ohmic value of the resistance. An instant later a charge due to this current has accumulated on the condenser, resulting in an appreciable counter electromotive force and hence a diminishing of the current flowing into the condenser; a short while later the charge has grown greater and the current has decreased some more. This goes on until the potential of the condenser due to its charge has reached the value of the potential producing it, the current at that point being zero. The potential of the condenser due to its charge increases logarithmically with time from zero to maximum while the current decreases logarithmically with time from maximum to zero.

The rate of increase of charge and therefore the rate of decrease in current is determined by R C, the time constant of the circuit, where R is the resistance of the circuit including the resistance of the condenser and C the capacity in farads. This is equal to the time required for the charge to reach .632 of its final or maximum value. This time is expressed in seconds. From the foregoing it can be seen that for any given capacity, all that is necessary to delay or increase the charge on the condenser is to vary the resistance of the circuit R. Also for any fixed value of R a different time constant will result if to it are connected capacities of varying values.

If, in a resistor condenser series combination, a resistance were shunted across or placed in parallel with the condenser, the charge on the condenser would never be higher than that caused by the voltage drop across the resistor, and also should the exciting source of potential be removed, the condenser will discharge through the parallel resistance. It is therefore possible to charge the condenser at a certain rate depending upon the value of the series resistance, and discharge it at another rate depending upon the value of the shunt resistance. The time constant holds good for either a charge or discharge condition and in the above case, two different time constants would be obtained. It is clearly seen from the above that since the condenser will not reach a higher potential than the potential across the shunted resistance, this resistance therefore will have to be as high as possible in comparison with the series resistance. If several resistances are shunted across the condenser it will charge up to the value of the potential across the equivalent resistance and the time constant for the discharge will be the product of the capacity and the value of the equivalent resistance.

In connection with the development of means to create electric impulses, all of the foregoing facts are used, also means which will prevent the condenser from discharging through anything but the relay coil. Such means may be contacts which open at the point of discharge and rectifiers which prevent current from flowing in the reverse directions. These will be described later.

Referring now to Figure 1, a relay 20 is provided with a coil 21, connected in parallel with an electrical charge and discharge device such as the condenser 22. The primary of a transformer 23 is connected between the juncture of the coil and the condenser and the armature 24 of the relay, and an electrical device such as a gaseous discharge tube, symbolically shown at 25, is connected across the secondary of the transformer.

A relay contact 26 is connected to one source of battery potential, and to the other juncture of the coil and condenser, is connected the other source of battery potential.

From the theory already described, the counter electromotive force of the condenser being zero when the potential is first applied, the current will flow through the transformer and be limited only by its resistance and inductance. This will fully excite a transformer in which L is smaller than R, and begin to charge the condenser. Before the excitation has been materially diminished due to the increasing charge on the condenser, the relay being of the quick-acting type, has operated, breaking the circuit, collapsing the flux of the transformer, and flashing the neon tube. The condenser now begins to discharge through the relay, which will remain operated until the potential of the condenser has fallen to the non-operative point of the relay where it will release its armature and the action will start all over again. The speed of the generated impulses is governed by the circuit and mechanical constants. The holding of the armature to the pole piece while the relay is being operated due to the condenser discharge is called the delay. While in this instance a load comprising a transformer and a discharge tube is employed, other electrical load devices may be substituted.

In Fig. 2 is shown a method for producing single pulses, and making use of a variable resistance 27 to control the time of charging the condenser 22. Since the rate of charge depends upon the value of the resistor and since the relay is shunted across the condenser and will not operate if the charge is not high enough, the variations of the resistance actually control the time of operation of the relay. Transformers of the impulse type, having comparatively high inductance, require a certain length of time for the current to grow until they are fully excited. If the relay has operated before the current has reached its maximum value in the transformer, the resulting secondary voltage may be too low to flash the tube or at best may flash it only faintly. The insertion of the resistance retards relay operation and enables the transformer to fully excite itself. By varying the resistance, the relay can be made to operate at the instant the current in the transformer has reached the proper value, thus effecting a great economy of current with the resultant long battery life. To prevent the condenser from discharging through the low resistance of the transformer instead of through the relay, a set of break contacts 28 is used. This prevents feed-back.

In Fig. 3, a very important addition is shown. This consists of a rectifier 29 placed in series with the variable resistance 27 and so arranged that current will flow easily through the rectifier and resistance in one direction but be constrained from flowing in the opposite direction. In all other respects, the operation is similar to that of Fig. 2. The addition of the rectifier prevents the condenser from discharging through the transformer and so eliminates one set of contacts. This system has the advantage of low current consumption, since less spring load is placed on the relay, and variable make time (a decided advantage) due to the variable resistance. The rectifier is preferably of the dry contact type.

In Fig. 4 are shown two arrangements of the invention as illustrated in Fig. 2, the righthand unit bearing the same reference numbers as Fig.

2 and the lefthand unit being numbered similarly but with the exponent "a."

In this arrangement, if the relay 20ª, resistance 27ª, and condenser 22ª, are adjusted to operate at a slow rate; and the resistance 27 and condenser 22 are adjusted to operate at a rapid rate, the load comprising the transformer 23 and electric discharge device 25, may be made to have a certain predetermined rate of operation in any unit of time as predicated on the timing of relay 20ª. This arrangement will produce a series of impulses separated by a longer interval.

In Fig. 5 is shown a device for causing delay in relay operation through the use of a copper slug or sleeve, or similar means 30. In the operation of this device, the armature 24 is prevented from being attracted to the relay 20 by the induced counter electromotive force in the slug 30. This allows current to flow through the load 23—25. Simultaneously, the condenser 22 will charge up. After this counter electromotive force has died down, the current which had been flowing in the coil 21 will attract the armature which is held against the relay by the discharge of the condenser 22 and the electromotive force in the slug 30. As in Fig. 2, the contacts 28 are used to prevent the condenser from discharging except through the relay coil 21.

Fig. 6 is similar to the showing of Fig. 5 with the exception that the contacts 28 have been omitted and the rectifier 29 incorporated to maintain the proper directional flow of the condenser discharge current.

From the foregoing several forms of the invention, it is apparent that wholly desirable means have been disclosed for attaining the objects set forth. As previously stated, the invention may be employed in other ways than those disclosed and also may be realized in other forms not herein indicated, but within the spirit and scope of the invention as claimed.

I claim:

1. In apparatus for the intermittent operation of electrical devices, an electro-magnetic device having a coil, an armature for said device connected to said coil, a condenser connected in parallel with said coil, an electric load device connected between one terminal of a source of direct current and the armature, said armature being adapted to be connected to the other terminal of said source of current when the coil is unexcited, means for causing discharge of the condenser only through the mentioned coil, and means on the electro-magnetic device having induced counter electromotive force for delaying attraction of the armature by said electro-magnetic device.

2. In apparatus for the intermittent operation of electrical devices, an electro-magnetic device having a coil, an armature for said device connected to said coil, a condenser connected in parallel with said coil, an electric load device connected between one terminal of a source of direct current and the armature, said armature being adapted to be connected to the other terminal of said source of current when the coil is unexcited, and means for causing discharge of the condenser only through the mentioned coil.

3. In apparatus for the intermittent operation of electrical devices, an electro-magnetic device having a coil, an armature for said device connected to said coil, a condenser connected in parallel with said coil, an electric load device connected between one terminal of a source of direct current and the armature, said armature being adapted to be connected to the other terminal of said source of current when the coil is unexcited, and means for causing discharge of the condenser only through the mentioned coil, said means comprising an armature switch connected between the electric load device and the first-mentioned terminal of the source of current and operatively associated with the electro-magnetic device.

4. In apparatus for the intermittent operation of electrical devices, an electro-magnetic device having a coil, an armature for said device connected to said coil, a condenser connected in parallel with said coil, an electric load device connected between one terminal of a source of direct current and the armature, said armature being adapted to be connected to the other terminal of said source of current when the coil is unexcited, and means for causing discharge of the condenser only through the mentioned coil, said means comprising an armature switch connected between the electric load device and the first-mentioned terminal of the source of current, said switch being closed during the charging period of the condenser and opened by the excitation of the electro-magnetic device during the discharge period of the condenser.

5. In apparatus for the intermittent operation of electrical devices, an electro-magnetic device having a coil, an armature for said device connected to said coil, a condenser connected in parallel with said coil, an electric load device connected between one terminal of a source of direct current and the armature, said armature being adapted to be connected to the other terminal of said source of current when the coil is unexcited, and means for causing discharge of the condenser only through the mentioned coil, said means comprising a rectifier arranged in a connection between a common connecting point of the mentioned coil and the condenser and the connection between the armature and the electric load device.

SAMUEL FEINGOLD.